March 1, 1949.  J. J. SICHMAN, JR  2,463,323
AXLE CONSTRUCTION
Filed Jan. 4, 1945
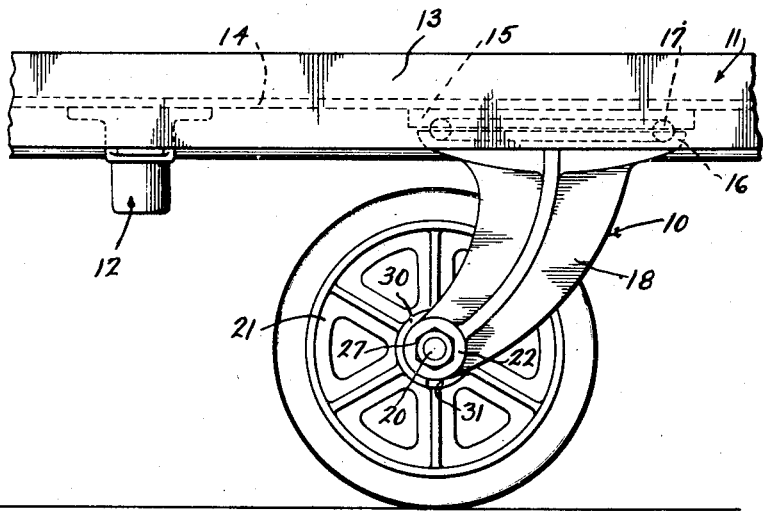
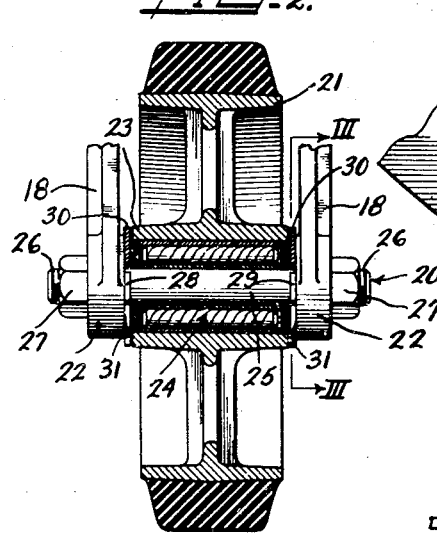
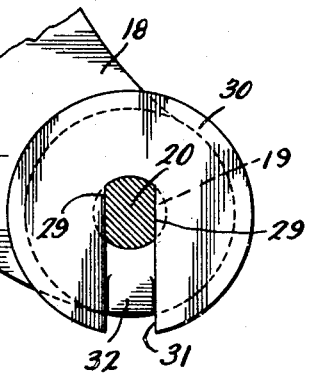
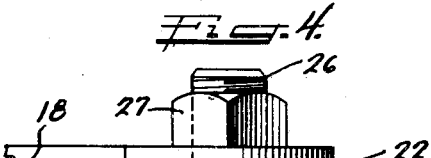
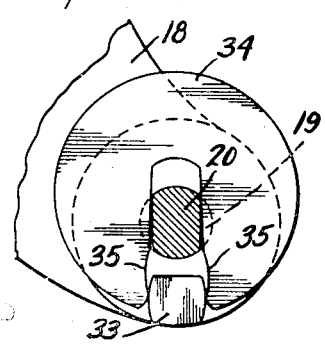
Inventor
John J. Sichman, Jr.

Patented Mar. 1, 1949

2,463,323

UNITED STATES PATENT OFFICE 2,463,323

AXLE CONSTRUCTION

John J. Sichman, Jr., Chicago, Ill., assignor to Mercury Manufacturing Company, Chicago, Ill., a corporation of Illinois Application January 4, 1945, Serial No. 571,309

5 Claims. (Cl. 16—46)

This invention is directed to an improved axle construction and relates more particularly to an axle construction particularly adapted for use on industrial trucks or the like, on which the wheels are mounted by caster assemblies.

It is an important object of the present invention to provide an improved axle construction for casters or the like in which the legs of the casters are bridged rigidly together at the lower or wheel receiving ends in such a manner that they may not be accidentally sprung relative to one another to vary the span thereof.

In the past it has been found that in constructions, for example, wherein an axle is extended through apertures in the bottom of the caster legs and cotter pins are utilized for maintaining the axle in position as it rotatably supports a wheel between the legs, accidental, lateral forces against the legs either break one or both of them, thus entirely destroying the assembly, cause outward movement thereof whereby one or the other of the cotter pins is sheared, or cause the movement of the legs toward one another whereby the wheel and axle are bound against rotation and the assembly thus rendered inoperative.

It is an object of the present invention to obviate the foregoing disadvantages and yet provide for an axle construction which is sufficiently sturdy to withstand the load tensions impressed thereupon without bending or breaking.

It has also been found in the past that if the use of cotter pins is obviated by the utilization of nuts on the ends of the axle, rotation of the nuts to obtain a secure assembly results in the lower ends of the caster legs being forced together with the result that the wheel and axle is bound therebetween against rotation.

It is another object of the present invention to provide a caster construction wherein provision is made for the use of end nuts on the axle and furthermore, wherein the nuts may be tightened to any desired degree without, in any way, effecting a binding of the wheel and the axle between the legs of the casters. In other words, with the present construction, the assembly may be secured tightly from the ends of the axle without the application of compressing forces by the legs upon the wheel therebetween.

It is still another object of the invention to provide a caster construction having the above attributes which may be made cheaply and yet will perform its intended functions efficiently.

Many other objects and advantages of the invention will become apparent from the following description and accompanying drawings, in which:

Figure 1 is a fragmentary side elevational view of a portion of an industrial truck utilizing a caster constructed in accordance with my invention;

Figure 2 is a fragmentary, vertical cross-sectional view, certain parts being shown in elevation, of a caster construction embodying my invention;

Figure 3 is an enlarged fragmentary cross-sectional view taken on the line III—III of Figure 2;

Figure 4 is a fragmentary, bottom plan view of a part of the assembly shown in Figures 2 and 3; and Figures 5 and 6 are fragmentary views similar to Figure 3 of a construction representing a modified form of my invention.

It will be understood that the embodiments shown herein are for illustrative purposes only and may be changed or modified without departing from the spirit and scope of the invention as set forth in the appended claims.

As will be seen from Figure 1, the caster assembly 10 embodying my invention may be mounted on the lower surface of a platform 11 of a suitable truck or other vehicle in which may be provided stake pockets 12.

While it will be understood that the particular vehicle construction has no bearing upon the present invention, the truck shown herein includes a platform having a frame 13 constructed from a T-bar, the stem 14 of which extends inwardly to provide for mounting of the various appurtenances. In the present instance the upper race 15 of a roller bearing assembly is mounted on the frame, the lower race 16 serving as the lower portion of the housing for ball bearings 17 and comprising the upper yoke of legs 18 of the caster assembly.

The ends of each of the legs 18 are provided with aligned apertures 19 (see Figure 3) for receiving an axle 20 on the central part of which, the wheel 21 is mounted. Preferably the lower ends of the legs 18 are provided with heavy circular bosses 22 in which the axle apertures are formed.

As will best be seen from Figure 2, the wheel 21 includes a central hub portion 23 which serves as a housing for a roller bearing assembly 24, the roller bearing assembly 24 in turn receiving the central portion 25 of the axle 20. Thus it will be seen that the axle carries, at its central part the wheel 21 in free rotatable relationship, the ends of the axle extending through the apertures 19 of the legs 18. The outwardly extending ends of the axle 20 are threaded as at 26 and these threaded ends are adapted to receive securing nuts 27 which tend to compress the ends of legs 18 toward one another to maintain a securely assembled mounting for the wheel.

It will be seen that in tightening the nuts 27, and thus forcing the ends of the companion legs 18 toward one another, there will be a tendency to compress the wheel 21 between the legs and thus bind the same against free rotation. On the other hand, if the nuts are left loose enough so that this binding action does not take place, it has been found that nuts are not tightly retained in the assembly and thus fall off during use with the result that the axle works out of position and the wheel is released from the assembly. Furthermore, if the nuts are so positioned that the wheel is not compressed between the ends of the legs 18, the latter are provided with no rigid bridging elements between the bosses 22, whereby they are entirely independent of one another so far as lateral flexure and accidental distortion is concerned.

To the end that the nuts 27 may be compressed as tightly as desired against the outer sides of the lower ends of the legs 18 without binding the wheel 21 therebetween, and to the end that after the nuts 27 have been ultimately positioned, the caster assembly will include a rigid bridge or yoke between the lower ends of the legs 18, the axle 20 is provided with vertical slots 28 and 29 on each side thereof, these slots being aligned in pairs, each pair being positioned longitudinally on the axle to be disposed immediately adjacent the inner surface of the respective boss 22 at the lower end of the respective leg 18.

As will best be seen from Figures 2 and 3, each pair of slots is adapted to receive a horseshoe washer 30 which is formed with a slot 31 extending partially therethrough.

In assembling the construction of Figure 2, the wheel 21 is positioned with respect to the lower ends of the legs 18 so that the aperture through the bearing 24 thereof is aligned with the apertures 19 of the legs, whereupon the axle 20 is inserted through the respective apertures 19 and the roller bearing 24. The axle 20 is then rotated so that the pairs of slots 28 and 29 which are aligned adjacent the inner surfaces of the respective bosses 22, extend vertically as shown in Figure 3. Thereafter the washers 30 are inserted between the respective boss 22 and the respective side of the hub 23 so that the inner edges thereof extend through the respective slots.

When the washers are so disposed it will be seen that their interlocking relationship with the slots 28 and 29 will delimit lateral inward movement of the ends of the respective legs 18 under the influence of compression when the respective nut 27 is tightened on the outer end of the axle. Thus there is provided an arrangement whereby, as the nuts 27 are tightened, the respective bosses 22 are placed under extremely high compression against the washers 30 without this pressure being transmitted to the sides of the hub 23 of the wheel 20 to bind the same against rotation. With such a construction it will be seen that the parts are interlocked together with an extremely tight fit and yet the wheel is free to rotate between the inner surfaces of the respective washers 30 which are spaced apart a distance slightly greater than the width of the hub 23.

To the end that the axle 20 will be secured against rotation during rotation of the wheel 21 and thus to prevent the washers from rotating and possibly falling away from the assembly, each of the bosses 22 on the respective legs 18 are provided at their inner surfaces with a protuberance 32 having a width substantially equal to or slightly smaller than the width of the slot in the horseshoe washers 30. From Figure 3 it will be seen that each of the washers 30 receives the respective protuberance 32 in the lower end of the slot 31 thereof, whereby rotation of the washers is prevented with respect to the adjacent boss 22 on the respective leg 18. Accordingly it will be seen that since rotation of the respective washers is thus prevented rotation of the axle itself is prevented. With such a construction it is evident that there is provided herein an arrangement wherein those parts not associated with one another through bearings are held in non-rotatable relationship to one another with the result that destruction and wear through friction engagement is prevented.

If desired, the washers 30 may be so engaged to the respective legs 18 that insertion thereof into the slots will be obtained by a press or force fit whereby the washers will be positively locked against removal from the assembly.

This force fit may be accomplished in a number of ways, but, as shown in Figure 5, the preferred manner includes the provision of protuberances 33 on each of the legs 18 in the place of those shown at 32 in Figure 3. These protuberances are preferably provided with outwardly convex side walls. In this construction the washers 34 are slotted similarly to the washers 30 of the constructions of Figures 2 and 3 but are provided with opposed concave edge portions 35 in that portion of the slot which is aligned with the protuberance 33 when the washer is driven home on the shaft 20. As will be seen from Figures 5 and 6, the overall width of the protuberances 33 is greater than the normal width of the slots in the washers 34 so that the reduced outer portion 36 of the slots, when driven downwardly over the respective protuberance 33, tends to spread the washer until the protuberance and the concave edge portions 35 are in alignment. Thus the springing action of the washers is utilized to bind the same against the respective protuberance to prevent accidental vertical movement of the washer with respect to the assembly.

In view of the foregoing it will be seen that there is provided herein a caster assembly having an axle in which the outer ends, protruding beyond the sides of the wheel hub may have extremely high bolt tightening pressures applied thereto, without these pressures being transmitted to the central portion of the axle, and binding the wheel between the legs 18. Furthermore, in the above described construction the reduction of the diameter of the axle is obviated since a bridging sleeve between the inner spaces of the lower ends of the respective legs 18 need not be accommodated in the roller bearing 24. Thus the lower ends of the legs 18 may be compressed tightly with the central portion of the axle 20 as the rigid bridging medium without the compression so utilized being accompanied by a binding action on the wheel between the legs.

What I claim is:

1. In a wheel mounting assembly, a pair of laterally spaced wheel mounting members having a wheel therebetween and an axle extending through said members and through said wheel, slots formed in pairs on opposite sides of said axle, one pair of said slots being disposed immediately inside one of said mounting members and another pair of said slots being disposed immediately inside the other of said mounting members, slotted members disposed over said axle with the slots thereof enveloping the respective slotted portions of said axle, and means on the outer ends of said axle for compressing said supporting members laterally inwardly against said slotted members on said axle, said slotted members being spaced from one another a distance substantially equal to or slightly greater than the width of the adjacent portion of the wheel, whereby the wheel may rotate freely on the intermediate portion of the axle.

2. In a wheel mounting assembly, a pair of laterally spaced wheel mounting members having a wheel therebetween and an axle extending through said members and through said wheel, slots formed in pairs on opposite sides of said axle, one pair of said slots being disposed immediately inside one of said mounting members and another pair of slots being disposed immediately inside the other of said mounting members, slotted members disposed over said axle with the slots thereof enveloping the respective slotted portions of said axle, and means on the outer ends of said axle for compressing said supporting members laterally inwardly against said slotted members on said axle, said slotted members being spaced from one another a distance substantially equal to or slightly greater than the width of the adjacent portion of the wheel, whereby the wheel may rotate freely on the intermediate portion of the axle, said slots in said slotted members having edges formed in irregular configuration and means on said mounting members for interfitting with the irregular configuration of said slots for maintaining said slotted members against accidental removal from the assembly.

3. In a caster assembly, a pair of leg members disposed in laterally spaced relationship, a wheel having an axle rotatably supporting the same and extending through said leg members, the width of the wheel being less than the space between said leg members to afford clearance at the side of the wheel, said axle having a flatted portion accessible in said clearance, a horseshoe washer engaging said flatted portion and thus being assembled with the axle against relative rotation, and means on the adjacent leg member interengaging with the horseshoe washer within the slot thereof and holding the washer, and thereby the axle against rotation relative to the leg.

4. In a caster assembly, a pair of laterally spaced wheel mounting members having a wheel therebetween and an axle extending through said members and through said wheel, a slot providing a flatted portion accessible between the wheel and one of said members, and a slotted washer straddling said axle and engaging in said slot and providing a limit against inward compression of the contiguous mounting member whereby to maintain the latter mounting member against binding the wheel.

5. In a caster assembly, a pair of laterally spaced wheel mounting members having a wheel therebetween and an axle extending through said members and through said wheel, a slot providing a flatted portion accessible between the wheel and one of said members, and a slotted washer straddling said axle and engaging in said slot and providing a limit against inward compression of the contiguous mounting member whereby to maintain the latter mounting member against binding the wheel, said mounting member having means thereon interengaging within the slot of the washer to hold the washer against rotation relative to the member and thereby also holding the axle against such relative rotation.

JOHN J. SICHMAN, JR.

REFERENCES CITED

The following references are of record in the file of this patent:

UNITED STATES PATENTS

| Number | Name | Date |
|---|---|---|
| 469,627 | Douglas | Feb. 23, 1892 |
| 725,403 | Breitwiser | Apr. 14, 1903 |
| 853,447 | French | May 14, 1907 |
| 1,143,261 | Ellett | June 15, 1915 |
| 1,456,881 | Carley | May 29, 1923 |
| 1,563,152 | Bowen | Nov. 24, 1925 |
| 1,602,631 | White | Oct. 12, 1926 |
| 1,875,965 | Waters | Sept. 6, 1932 |
| 1,900,672 | Uhl | Mar. 7, 1933 |
| 2,082,798 | Herold | June 8, 1937 |